United States Patent

Suykens

[15] 3,704,797
[45] Dec. 5, 1972

[54] BULK MATERIAL DISCHARGING ARRANGEMENT

[72] Inventor: Matthieu Suykens, Belleville, Ontario, Canada

[73] Assignee: Borg-Warner (Canada) Ltd., Oakville, Ontario, Canada

[22] Filed: May 24, 1971

[21] Appl. No.: 146,425

Related U.S. Application Data

[63] Continuation of Ser. No. 842,535, July 17, 1969, abandoned.

[52] U.S. Cl. ............................... 214/15 D, 222/502
[51] Int. Cl. ............................................. B65g 67/58
[58] Field of Search ...214/17 R, 15 D; 105/240, 284; 222/502, 503, 504

[56] References Cited

UNITED STATES PATENTS 2,237,299  4/1941  Benbow et al. ........ 105/284 X
2,505,982  5/1950  Meissner ................ 214/15 D Primary Examiner—Robert G. Sheridan
Attorney—Maybee and Legris

[57] ABSTRACT

An equalizer basket gate for regulating the discharge of bulk material from a hopper, comprises a pair of similar gate members positioned beneath the hopper and arranged symmetrically with respect to it. The gate members are suspended so that the pressure of bulk material on them tends to open the gate. The gate members are closed, and restrained against opening, by a pair of hydraulic rams connected in parallel to a pressure fluid supply. A mechanical locking device is also provided for holding the gate members in the closed position.

7 Claims, 5 Drawing Figures

Inventor
Matthieu Suykens
By Maybee & Legris
Attorney

Inventor
Matthieu Suykens

By Maybee & Legris
Attorney

BULK MATERIAL DISCHARGING ARRANGEMENT

This application is a continuation of application Ser. No. 842,535, filed July 17, 1969, now abandoned.

This invention relates to discharging arrangements for bulk material and is concerned particularly with a gating arrangement for limiting or regulating the flow of bulk material through a hopper opening. One particular application of the invention is to a gating arrangement for unloading bulk material in self unloading cargo vessels with holds of the hoppered type, the material being discharged from the hoppers to an endless conveyor or the like beneath the hold. However, the invention is readily applicable to gating arrangements for regulating the discharge of bulk material from silos, bunkers, and other storage devices with discharge hoppers.

It is one object of the present invention to provide a gating arrangement of simple construction which requires a minimum amount of operating equipment, thus facilitating maintenance and increasing security.

Another object of the invention is to provide a bulk material discharging arrangement for use in cargo vessels which, by the simplicity of its construction, simplifies design problems associated with prior arrangements of this type.

According to the present invention, in a bulk material discharging arrangement of the type comprising a hopper having a discharge opening, a gate positioned beneath the discharge opening and forming a closure therefor, and power means for opening and closing the gate, the gate consists of a pair of similar gate members arranged symmetrically with respect to a medial line of the opening, each gate member being suspended by a set of suspension members for swinging movement towards or away from said medial line to close and open the gate; the gate members are preferably suspended so as to be biased away from said medial line towards an open position by the pressure of cargo. The power means for opening and closing the gate may comprise a pair of hydraulic rams each connected to a respective gate member, the rams being connected in parallel to a pressure fluid supply to ensure that the fluid pressures acting on the rams are equalized.

In summary, the improvement of this invention is in a bulk material discharging arrangement, especially usable for cargo vessels, having a hopper with a discharge opening, a gate positioned beneath the opening and forming a closure therefore, and power means for opening and closing the gate. The improved arrangement comprises a pair of gate members arranged symmetrically with respect to a medial line of the opening; and a set of suspension members for each gate member for swinging movement towards and away from the medial line of the opening. Each set of the suspension members comprises at least two pairs of suspension members, the pair of suspension members farthest from the medial line being substantially parallel to a plane passing through the medial line and normal to the gate members when in closed position, and the pair of suspension members nearest the medial line being angularly disposed with respect to the plane when the gate members are in closed position. By this arrangement, each gate member is biased away from the medial line by pressure of cargo.

One embodiment of the invention, as applied to a discharging arrangement for use inside a cargo vessel will now be described by way of example with reference to the accompanying drawings, in which.

Figure 2:
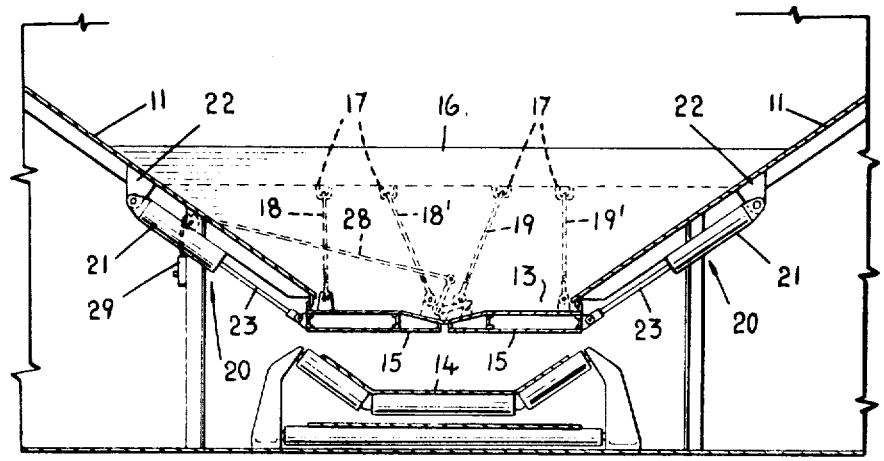
FIG. 2 shows a section on line 2—2 in FIG. 1, the gate being in a closed position.
Figure 1:
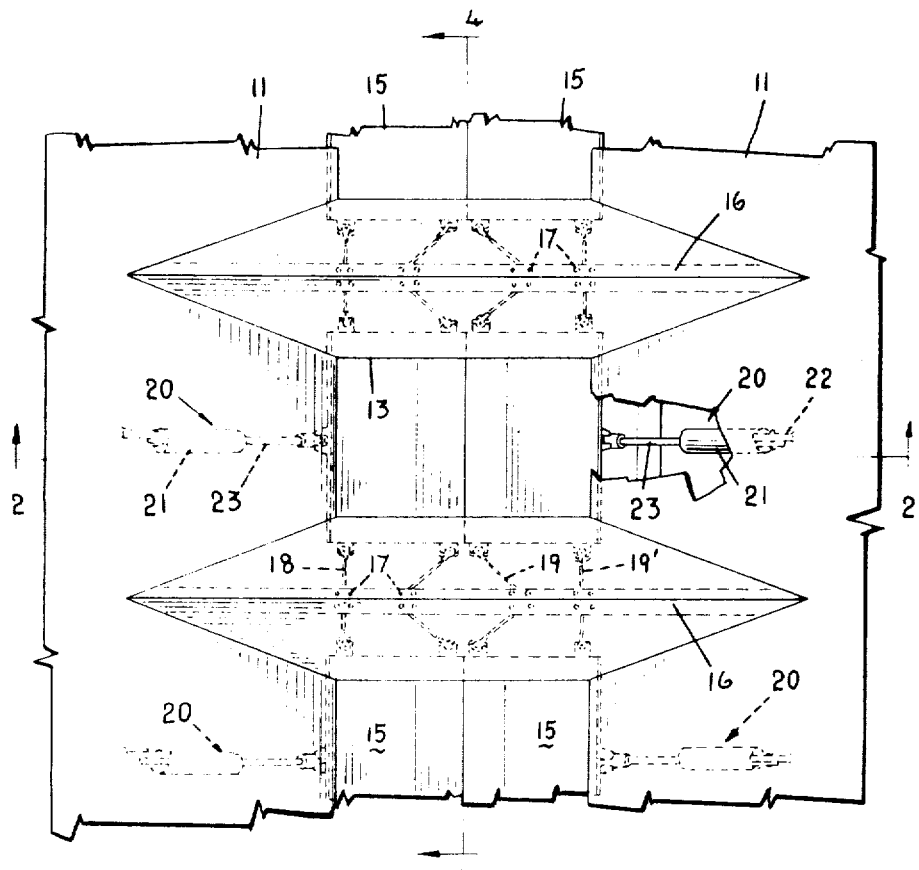
FIG. 1 is a plan view of a portion of the hold of the vessel.

Referring to the drawings, in a self-unloading cargo vessel adapted to carry bulk material, the hold 10 is formed with a sloping floor 11 providing a series of hoppers 12 which are aligned longitudinally along the vessel. Each hopper 12 has a rectangular discharge opening 13, and an endless belt conveyor 14 extends beneath the hold to receive material discharged from the hoppers 12.

Figure 3:
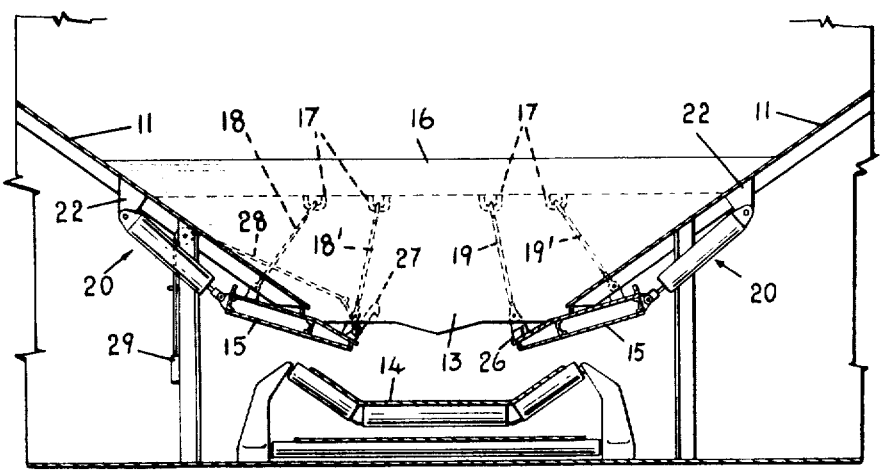
FIG. 3 is a view similar to that of FIG. 2, the gate being in an open position.
Figure 4:
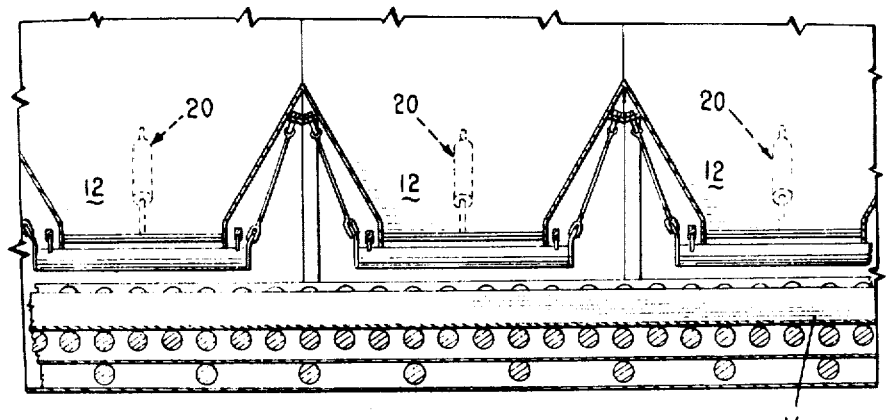
FIG. 4 shows a section on line 4—4 in FIG. 1.
Figure 5:
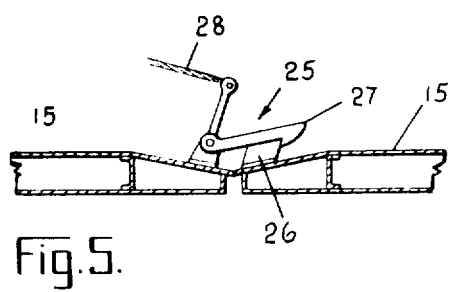
FIG. 5 illustrates a mechanical locking device used on the gate.

Each hopper 12 has a gate consisting of two similar gate members 15 which are arranged beneath the discharge opening 13 and cooperate to form a closure therefor. It will be seen that the gate members 15 are arranged symmetrically with respect to a medial line of the discharge opening, the latter being aligned with the longitudinal axis of the hold 10. The hopper floor 11 is supported by a rigid support structure 16. Forming part of this support structure are series of brackets 17 which are positioned above the plane of the hopper discharge openings. Each gate member 15 is suspended from the rigid support structure by a set of four support chains (suspension members) 18, 18', 19, 19' which are connected at their ends to the gate members and the brackets 17. As best illustrated in FIGS. 2 and 3, the brackets 17 to which the support chains are connected are closer together than the points at which the support chains are connected to gate members; each set of support chains are so arranged that the gate members are capable of swinging movement in a direction transverse to the medial line of the discharge opening, that is to say, towards and away from the medial line. The mounting of the gate members is such that they are biased away from the medial line, or closed position, by the pressure exerted on them by cargo.

The swinging movement of the gate members for opening and closing a gate is effected by means of a pair of hydraulic rams 20, each having a cylinder 21 pivotally connected at one end to a support bracket 22 and a piston 23 connected to one side of a gate member. The rams are connected in parallel to a common pressure fluid supply; thus the pressures exerted on the pistons of any pair of rams are always equal, and the gate members are moved by equal amounts. The gate members are therefore always arranged symmetrically with respect to the discharge opening.

In order to close a gate, or maintain it closed, the rams 20 are operated so as to urge the gate members towards one another, against the bias exerted by the cargo. In order to open a gate by any desired amount, the fluid pressure is reduced by the required amount, each gate member being thus swung outwards to a position at which the turning moment exerted by the cargo pressure is equal to the turning moment exerted by the ram.

A mechanical locking device 25 is provided for retaining the gate in a closed position without the aid of fluid pressure. This device comprises a stationary bar 26 positioned near the edge of one gate member, and a pivoted latch 27 positioned near the edge of the other gate member. The latch 27 is adapted to hook onto the bar 26 to lock the gate members together positively. In order to release the locking device prior to opening the gate, it is necessary first to admit pressure fluid to the cylinders 21 to urge the gate members together, when the latch 27 can be lifted by means of the cable 28.

It will be appreciated that other methods of interlocking the operation of the locking device with the ram operation, for example, one end of the cable 28 may be connected to a member (such as the member 29) which is interlocked mechanically with a fluid control valve operating member in such a way that the member cannot be moved until the valve is actuated to admit fluid pressure to the cylinders. Alternatively, the locking device may comprise a hydraulically operated bolt which cannot be released until pressure fluid is admitted to it from the fluid circuit supplying the rams.

I claim:

1. In a bulk material discharging arrangement comprising a hopper having a discharge opening, a gate positioned beneath the opening and forming a closure therefor, and power means for opening and closing the gate, the improvement comprising,
   a pair of gate members arranged symmetrically with respect to a medial line of the opening;
   a set of suspension members for each gate member for swinging movement towards and away from said medial line;
   each set of suspension members comprising at least two pairs of suspension members;
   the pair of suspension members furthest from said medial line being substantially parallel to a plane passing through said medial line and normal to said gate members when in closed position;
   the pair of suspension members nearest said medial line being angularly disposed with respect to said plane when said gate members are in closed position;
   whereby each gate member is biased away from said medial line by pressure of cargo.

2. A bulk material discharging arrangement as in claim 1, in which said suspension members are pivoted at their opposite ends, the pivot points of said suspension members furthest from said plane being located in a second plane, substantially parallel to said first-named plane, and the pivot points of the suspension members nearest said first-named plane being located in a third plane angularly arranged with respect to said first-named and second planes.

3. A bulk material discharging arrangement as claimed in claim 2, wherein the power means comprises a pair of hydraulic rams each connected to a respective gate member, the rams being connected in parallel to a pressure fluid supply, and operable by fluid pressure to urge the gate members towards the closed position against said bias.

4. A bulk material discharging arrangement as claimed in claim 3, including a mechanical locking device comprising a pair of cooperating catch members mounted one on each gate member for securing the gate members in the closed position, said locking device being releasable only when the hydraulic rams are actuated.

5. In a cargo vessel having a hold providing a series of hoppers each with a discharge opening, and a belt conveyor extending longitudinally beneath the series of discharge openings, each hopper having a gate positioned beneath the opening to form a closure therefor and a power means for opening and closing the gate, the improvement which comprises:
   each gate having a pair of gate members arranged symmetrically with respect to a longitudinal medial line of the discharge opening;
   a set of suspension members for each gate member for swinging movement towards and away from said medial line;
   each set of suspension members comprising at least two pairs of suspension members;
   the pair of suspension members furthest from said medial line being substantially parallel to a plane passing through said medial line and normal to said gate members when in closed position;
   the pair of suspension members nearest said medial line being angularly disposed with respect to said plane when said gate members are in closed position;
   whereby each gate member is biased away from said medial line by pressure of cargo.

6. In a cargo vessel as recited in claim 5 in which said suspension members are pivoted in opposite ends, the pivot points of said suspension members furthest from said plane being located in a second plane substantially parallel to said first-named plane, and the pivot points of the suspension members nearest said first-named plane being located in a third plane angularly arranged with respect to said first-named and second planes.

7. The improvement claimed in claim 6, wherein each power means comprises a pair of hydraulic rams each connected to a respective gate member, the rams being connected in parallel to a pressure fluid supply.

* * * * *